Patented May 20, 1952

2,597,625

UNITED STATES PATENT OFFICE 2,597,625

PROCESS FOR APPLYING MOISTUREPROOF COATING TO REGENERATED CELLULOSE

Nicolas Drisch and Paul Herrbach, Paris, France, assignors to La Cellophane, Paris, France, a French company No Drawing. Application June 23, 1950, Serial No. 170,040. In France July 1, 1949

1 Claim. (Cl. 117—145)

This transparent hydrophilic films, particularly films of regenerated cellulose, have been used for many years in the packing industry. Experience has shown that such films have been sensitive to water and somewhat sensitive to fatty substances, as well as permeable to water vapor. To overcome these disadvantages, it has been proposed to coat the films with a very thin layer of a water-proof varnish, and practical results were first obtained with varnishes based on cellulose derivatives associated with certain quantities of waxes, resins and gums. To improve the adhesion of the coats of varnish, particularly when the films were to be exposed to the action of products with a high water content, e. g. in the case of containers for frozen food products, the varnish has at times been anchored by means of a thin undercoat, based on certain artificial resins.

Apart from cellulose varnishes many other suggestions have been proposed for providing these thin films with coatings that would increase their resistance to water, water vapor, etc. However, while the various known techniques generally afford more or less waterproofing effect, the films produced frequently have the disadvantage that this desired effect is lost rapidly after the film is used for packing purposes, owing to the chemical, physical or mechanical processes involved. The permeability of the finished containers in which products have been packed thus increases quite rapidly with the passage of time.

The prerequisites for the moisture-proofing of thin films may be summarized as follows:

1. Permeability to water vapor must be of the order of not over 50 grams per 100 sq. m. of area per hour at 38° C. for a relative humidity of 90% at the exposed surface.

2. The films must remain flexible when cold.

3. The films must remain such as to permit welding by heat.

4. If the varnishes contain plasticizers, the latter must not exude.

5. The adhesion of the coating of varnish must be satisfactory when in contact with aqueous mixtures.

6. The permanence of the results, in the sense previously indicated, must be satisfactory.

7. Solvents used as vehicles must be cheap and easily recoverable.

8. The materials to be employed must be inexpensive.

It is possible to prepare films covered with a varnish consisting of vinyl derivatives. However, such films have poor moisture-proof properties compared to those coated with a nitro varnish and paraffin. The impremeability of the layer of resins may be considerably increased by incorporating long-chain fatty derivatives with it, e. g. ethers of high fatty alcohols, ketones, chlorinated derivatives of paraffin chains or chlorinated derivatives of phenyl oxide.

The object of the present invention is to provide a new type of waterproof, water-vapor-proof and fat-proof film suited to meet the foregoing prerequisites and a method of making the same. More particularly, the invention relates to a thin hydrophilic film, specifically a film of regenerated cellulose, with thin coatings of vinyl derivatives, specifically a product sold under the trade name of Geon, comprising a copolymer of vinyl chloride and vinylidene chloride containing up to 25% of the latter, this substance being associated with a small quantity of an ether of fatty alcohols with at least 16 carbon atoms, preferably the dicetyl ether.

The products are applied in aqueous solution or dispersion, by known processes. When solutions are used, methyl ethyl ketone may be used as solvent, preferably with a certain admixture of toluene, e. g. 25%, to facilitate the solution of the fatty ethers. The addition of a few per cent. of a plasticizer, as e. g. 3% of ethyl diglycol phthalate or 2% of dicetyl phthalate, is advantageous, and further reduces the permeability. The adhesion of the coatings of varnish may be improved by means of suitable undercoats, e. g. by means of undercoats or resin (melamine formaldehyde). Aqueous dispersions of Geon must be freshly prepared, as they are relatively unstable. They are preferably applied prior to final drying of the film.

There is a known technique of preparing thin moisture-proof film from polymers of vinyl chloride and its copolymers with vinylidene chloride, with addition of ethers of fatty alcohols having 12 to 18 carbon atoms, pursuant to U. S. Patent No. 2,435,464 of March 11, 1944, but this relates to separate films instead of coatings applied to films.

Further, U. S. Patent No. 2,034,020 of March 17, 1936, contemplates the application of waterproofing coatings of polyvinyl compounds to cellulose-derivative surfaces, using a solvent not attacking the substratum. French Patent No. 799,631 of December 20, 1935, specifies the replacement of waxes in cellulose varnishes for regenerated cellulose films by ethers of higher fatty alcohols, and French Patent No. 718,440 of June 9, 1931, contemplates the use of polyvinyl resins and paraffins for the same purpose.

Finally, British Patent No. 497,001 of May 6, 1937, refers to the plasticization of polyvinyl compounds by means of ethers of higher fatty alcohols, as cetyl benzyl ether, etc. However, none of these patents deals with the coating of thin hydrophilic films with a copolymer of vinyl chloride and vinylidene chloride, associated with an ether of fatty alcohols having from 12 to 18 carbon atoms and preferably at least 16 carbon atoms, nor with the special prerequisites which such coated films are required to meet.

The invention will be more readily understood in terms of the following examples, which, however, are in no way restrictive, and the invention of course extends likewise to any variant of the same idea. Thus the invention extends to thin hydrophilic films other than those of regenerated cellulose, e. g. to films of polyvinyl alcohol, caseine and other proteins, cellulose esters and ethers with moderate substitution, etc.

*Example 1*

Regenerated cellulose film weighing 30 grams per sq. m. is coated with a solution of "Geon 205" associated with 3% dicetyl ether referred to the resin, dissolved in methyl ethyl ketone, and is then dried.

The material is applied at the rate of 1.3, 2.2 or 4.5 grams per sq. m. by varying the concentrations of the solution and/or the rate of application and scraping. The permeability to water vapor is 360, 102 or 47 grams per 100 sq. m. per hour in the three respective cases, at 38° C. and a relative humidity of 90% on the exposed surface.

Even for only 2% dicetyl ether, the effect obtained is very considerable, the permeability for a coating of 4.5 grams per sq. m. being 85 instead of 47.

The permeability of the unprocessed film is of the order of 3000 units, and that of a film coated with conventional cellulose varnish is about 10 units, but whereas the film moisture-proofed with cellulose varnish deteriorates in use and rapidly becomes more permeable when humid products are packed in it, becoming practically equivalent to the uncoated film after a time, the film pursuant to the invention preserves its properties intact. Thus a film moisture-proofed with cellulose varnish and used to preserve chocolate for 8 weeks at 90% relative humidity and 22° C. had a permeability of 2544 units as compared to 9 units at the outset, whereas the same film with a coating of 4.5 grams per sq. m. as in the example preserved its properties under the condition specified.

Like all moisture-proof varnishes, the permeability to water vapor increases sharply with the temperature, being very slight at low temperatures.

*Example II*

Substantially the same procedure, but using a mixture of 75% methyl ethyl ketone and 25% toluene as solvent, to favor the solution of the dicetyl ether, and adding 3% of ethyl diglycol phthalate as plasticizer, referred to the varnish.

For a density of 2.1 grams of coating per sq. m., we obtain a permeability of 81 units, as against 102 units for 2.2 grams per sq. m. without toluene and without plasticizer. The effect of increased density of coating on permeability is much as before.

*Example III*

The moisture-proofing treatment described in the preceding examples is insufficiently stable to water immersion or contact with wet products. Thus there is separation of layers, or blistering, upon immersion in boiling water for 5 minutes or water at 19° C. for 24 hours (German tests), or upon immersion in water at 45° C. for 1 hour and 30 minutes (American test).

On the other hand, if the film to be moisture-proofed is previously impregnated with a dispersion of 5% dimethylol melamine having a pH of 4, due to the presence of a trace of lactic acid, and then dried, we obtain perfect adhesion without any blistering upon prolonged immersion at 19° or 45° C.

It should be noted that the coatings made with "Geon 205" associated with dicetyl ether are fat-proof, oil-proof and even gasoline-proof, and preserve these properties when in the form of wrappings in contact with such materials.

Flexibility at low temperature is very satisfactory, and this fact, together with the water resistance of the coated films and the improvement of adhesion by means of undercoats, permits extensive application in the packing of frozen products, particularly in the case of products that are quick-frozen in their wrappers and then placed in cold storage.

Welding involves no difficulty. However, in the case of unplasticized coatings, better results are obtained at a temperature slightly above the usual 130° C. Excellent results are obtained at 150° C. In the presence of a plasticizing agent, a temperature of 130° C. is preferable.

The small percentage of plasticizer in Example II is insufficient to produce effects of exudation.

The methyl ethyl ketones used as solvent is not prohibitive in price, and is readily recovered. The resin constituting the moisture-proofing layer is also reasonably inexpensive.

It should be noted that the films pursuant to the invention have satisfactory luster and excellent transparency.

What is claimed is:

The method of applying a moisture-proof coating to a base of regenerated cellulose which comprises applying to said base a solution in methyl ethyl ketone of a copolymer of vinyl chloride and vinlidene chloride containing not over 25% of vinylidene chloride and an ether of a fatty alcohol having from 12 to 18 carbon atoms to form a coating of from 1 to 5 grams per sq. m. of said copolymer, said solution containing about 25% of toluene to facilitate the dissolution of the ether.

NICOLAS DRISCH.
PAUL HERRBACH.

REFERENCES CITED

The following references are of record in the file of this patent:

UNITED STATES PATENTS

| Number | Name | Date |
|---|---|---|
| 2,334,236 | Arnold et al. | Nov. 16, 1943 |
| 2,392,972 | Cheyney | Jan. 15, 1946 |
| 2,435,464 | Radcliffe | Feb. 3, 1948 |
| 2,462,185 | Hauser | Feb. 22, 1949 |
| 2,530,738 | Spessard | Nov. 21, 1950 |